United States Patent Office 2,947,304
Patented Aug. 2, 1960

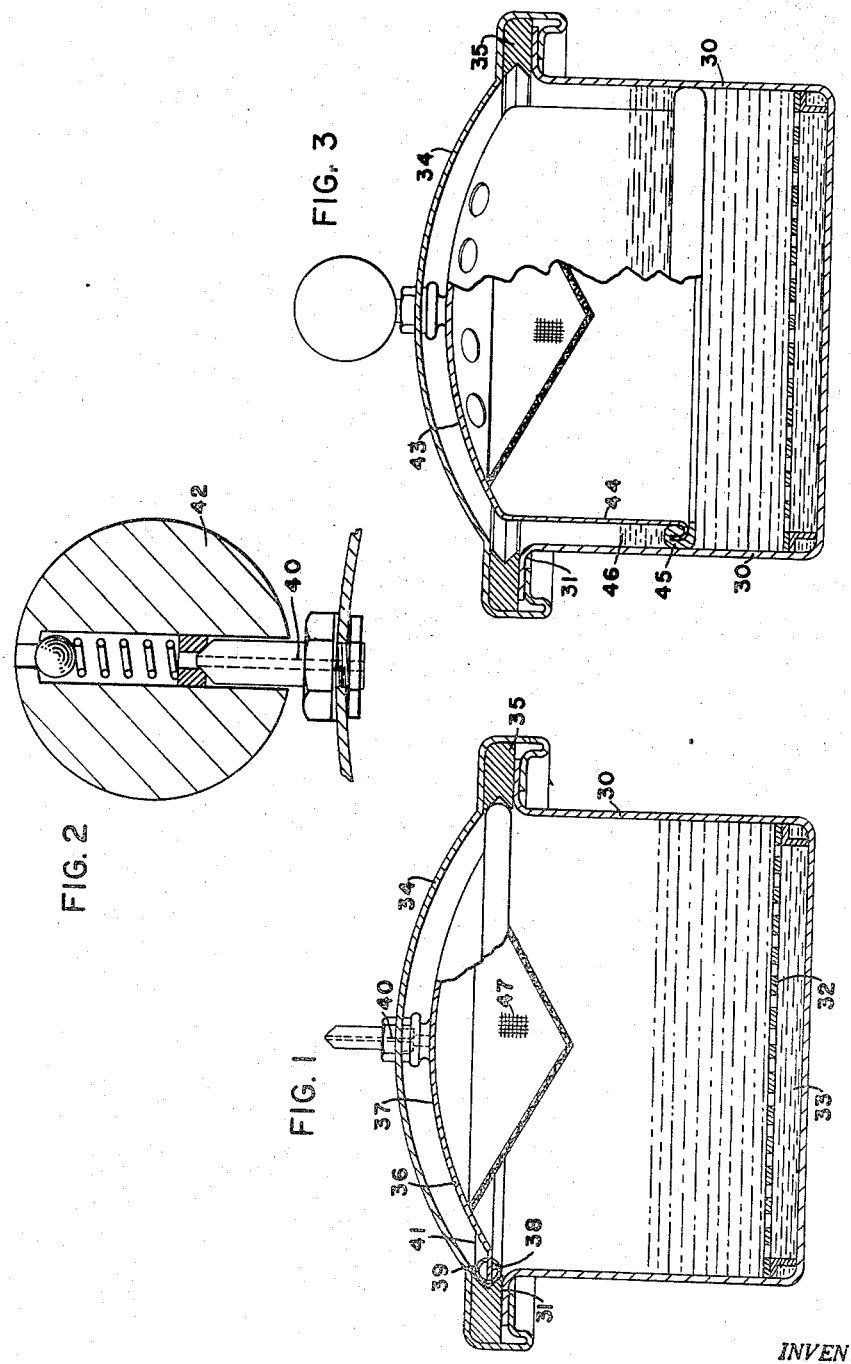

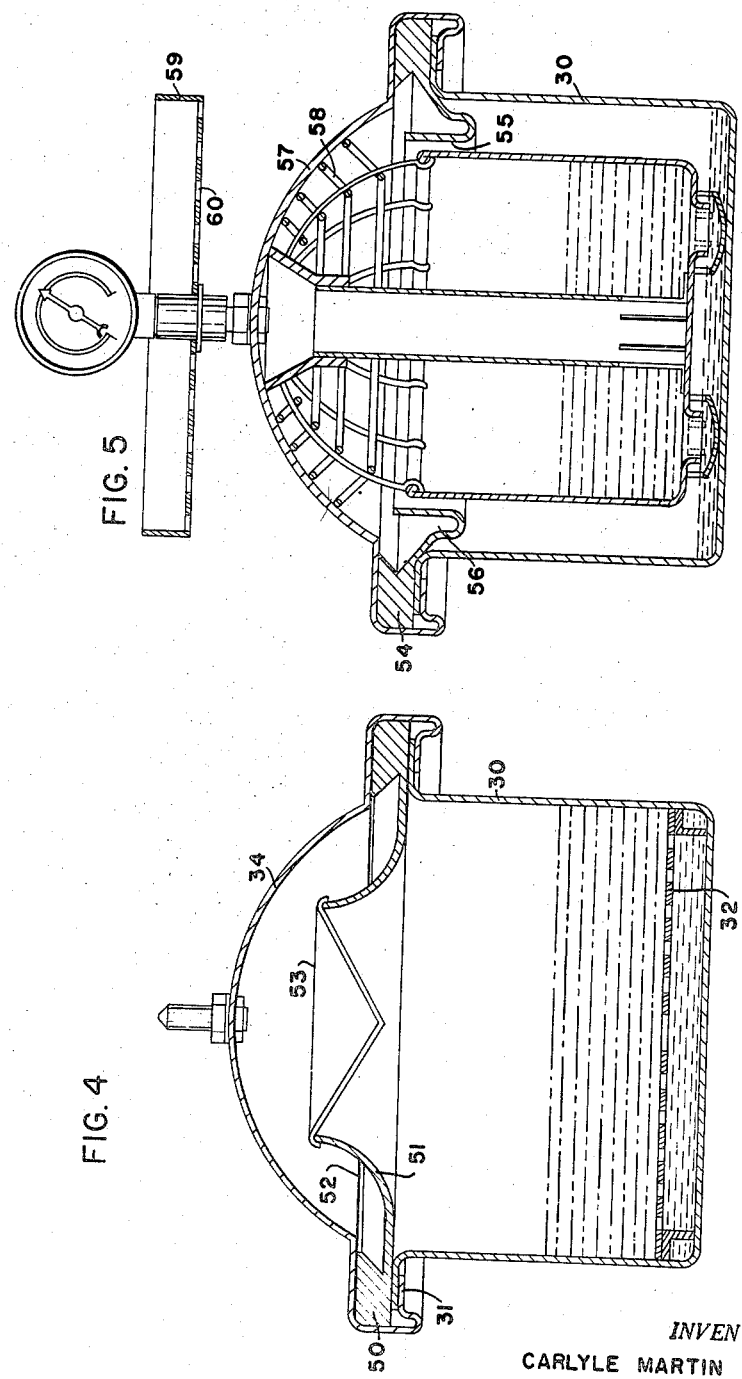

2,947,304

APPARATUS FOR PROCESSING FOOD PRODUCTS

Carlyle Martin Ashley, Fayetteville, N.Y., assignor to Carrier Corporation, Syracuse, N.Y., a corporation of Delaware Original application Nov. 14, 1951, Ser. No. 256,315, now Patent No. 2,870,020, dated Jan. 20, 1959. Divided and this application June 2, 1958, Ser. No. 739,413

3 Claims. (Cl. 126—381)

This application is a division of copending application, Serial No. 256,315, filed November 14, 1951, now Patent No. 2,870,020, January 20, 1959 entitled "Method and Apparatus for Blanching Food Products." This invention relates to apparatus for steam blanching food products, collecting dissolved solids, and returning the dissolved solids to the food product during the cooling operation.

In food freezing, either domestic or commercial, it is essential to blanch or scald the food product, particularly vegetables, before the freezing operation to destroy or render inactive the enzymes to prevent the appearance and taste of the frozen product being deleteriously affected. While blanching is conducted to destroy the principal enzymes, overblanching should be avoided.

Blanching has generally been conducted by means of boiling water or steam. Water blanching is not satisfactory for it results in a decrease in the nutritive value of the food product since a large proportion of the juices and dissolved solids such as vitamins and minerals are washed away. It may result in a relative loss in weight in the final product which is extremely serious in commercial applications since the product is sold by weight. The water supply too may affect the texture, appearance, odor, flavor, nutritive value or storage life of the product since it may contain materials injurious to any or all of such factors; to avoid damage to the food product from the water supply, it is customary in larger freezing plants to provide expensive water treatment equipment.

In the steam blanching processes as heretofore conducted, the solids dissolved in the condensate are not returned to the product but are wasted. A further disadvantage rests in the fact that in the processes used heretofore the product is washed with water when it is in a soft, porous condition to cool the same with resulting loss of a considerable additional percentage of solids.

The chief object of the present invention is to eliminate the present disadvantages of steam blanching and water cooling.

A still further object is to provide apparatus for steam blanching and subsequent cooling of food products adapted for domestic use.

A still further object is to provide blanching apparatus in which condensate is removed from the food product at the end of the heating operation.

A still further object is to provide apparatus to blanch a food product and to cool the same while returning dissolved solids and juices thereto to restore its original weight, flavor and appearance. Other objects of the invention will be readily perceived from the following description.

This invention relates to apparatus for blanching and cooling food products which comprises, in combination, means for supplying a heated vapor over the food product to heat the same thereby condensing at least a portion of the vapor, means for collecting at least a portion of the nutrients given off by the food product when it is contacted by the vapor, and means for distributing at least a portion of the collected nutrients over the food product to restore a substantial portion of the original nutrient content.

The attached drawings illustrate preferred embodiments of the invention, in which Figure 1 is a sectional view of a blanching and cooling device;

Figure 2 is a sectional view of a pressure relief valve; and

Figures 3, 4 and 5 are sectional views of modified blanching and cooling devices.

In Figure 1 there is shown an arrangement particularly suited for use with those foods whose juices tend to foam readily, thus bodily displacing the air from the vessel. There is shown a vessel or pan 30 terminating in an outwardly extending flange 31. A perforated support 32 for the food product is spaced from the bottom of the vessel, the space between the support and the bottom of the vessel serving as a sump 33 for water or other heating medium. A cover 34 clamps a gasket 35 against flange 31 to securely close the vessel. This clamping action may be achieved by well known means employed on conventional pressure cookers wherein the cover flange has dogs extending radially inwardly to engage dogs extending from the vessel flange. A cone-shaped or dome-shaped member 36 having perforations 37 centrally thereof to permit vapor to pass therethrough is placed between the cover and the vessel. The downward coned perforated central section 47 serves to break foam created during the heating operation. The peripheral edge 38 of member 36 carries a gasket 39 which is placed adjacent gasket 35 when member 36 is in place. The usual pressure relief vent 40 is provided in cover 34. Cover 34, gasket 39, and member 36 cooperate to provide a storage space 41 for condensate during the cooling operation.

When the heating operation is completed, cold water is sprayed over the vessel to reduce the pressure therein. Water in the vessel evaporates to cool the product, a portion of the vapor condensing as it strikes the cool cover and collecting in space 41, whence it may be easily removed when the vessel is opened to remove the food product. The device illustrated avoids extra water in the food product, since substantially all the water vapor used for heating purposes may be condensed, collected and removed from the product. The size of the storage space is predetermined, of course, by the amount of condensate anticipated, such amount being related to the amount of food in the vessel and the temperature change. Ordinarily, this is about one ounce per pound of food cooled plus one ounce for cooling the pan per 70° cooling range.

The device shown is desirable for use in any vapor cooking process, in order that excess water added at the beginning of the cooking process, to avoid food running dry during the cooking operation, may be removed. If desired, a pressure regulator with a vacuum breaker valve 42 may be used when the device is employed for cooking. When the cooking process is completed, the device is placed under a stream of cold water and the pressure reduced to atmospheric or preferably somewhat below atmospheric pressure. To regulate the amount below atmospheric pressure, valve 42 is applied to the pressure regulating means. Since its purpose is to interrupt the cooling process before it is complete, as the vacuum in the vessel reaches a predetermined amount, air will be permitted to enter the vessel to stop condensation. An advantage of this procedure resides in the fact that juices and dissolved solids are retained with the food product.

It will be appreciated that during the cooling operation it is desirable that the vessel be spaced from the bottom of a sink in order that the base of the vessel is not cooled. It is preferable that the cooling water be directed on the cover; the extended portion of the cover serves as a skirt to direct water impinging upon the cover away from the vessel to prevent contact of the cooling water with the sides of the vessel which would be undesirable.

In Figure 3, there is shown a modified form of the device shown in Figure 1. In this case, dome-shaped member 43, generally similar to member 36, is provided with a downwardly extending skirt 44 spaced from the wall of the vessel 30. The lower edge of skirt 44 carries a gasket 45 which seals against the wall of the vessel to provide a storage space 46. Foam breaker in the form of screen 47 may be provided. In other respects, this device may function similarly to the device shown in Figure 1. As illustrated, it is adapted for use primarily in vacuum cooking procedures but, as previously described, it may be employed for blanching and cooling.

The device illustrated in Figure 4 is similar to the device illustrated in Figure 1 except that it contains modified means for collecting condensate during the cooling process. In the device shown in Figure 4, gasket 50, which forms the seal between cover 34 and vessel 30, is provided with an inwardly and upwardly extending portion 51, which, in cooperation with cover 34, forms a storage space 52 for condensate. It will be appreciated the length of extended portion 51 depends largely upon the capacity of the storage space required. If desired, a conical screen or perforated plate 53 may be attached to the top of the gasket (the protruding edge of portion 51) to break up any foam which might otherwise be carried over to the storage space 52.

It will be appreciated that in the devices shown in Figures 1, 3 and 4, the skirt on the outer edge of the cover is so formed as to deflect water from the walls of the vessel thereby confining cooling to the cover.

The final amount of juices remaining in the food product may be larger or smaller than with the devices earlier described. The change in water is equal to the amount of water initially placed in the vessel for heating medium minus a quantity consisting of the amount of vapor vented plus the amount of vapor condensed and collected separately. In other words, there may be a gain in weight or a slight loss in weight of the food product.

Figure 5 illustrates a device in which the excess condensate storage feature is embodied in a blanching device. In the device shown in Figure 5, gasket 54 is provided with a downwardly, inwardly and upwardly extending portion 55 which forms a storage space 56 for excess condensate. Preferably the cover 57 is provided with deflector rings 58 which interrupt flow of water down the sides of the cover and vessel and permit some portion of the condensate to return to the food product in case it is not fully wet by foaming from below. While storage space for excess condensate is provided, it will be appreciated the food product will not be dried to an undesirable extent by evaporation, since some portion of the liquid will be returned to the food product. A pan 59 provided with perforations 60 may be placed above the cover 57 to assure equal distribution of cooling water over the surface of the cover. The quantity of condensate collected will be a fraction of the total amount of condensate minus condensate diverted to the food product by rings 58. Preferably, the drains are trapped to prevent vapor blowing up underneath.

Considering the use of this device for domestic blanching, the food product is placed within the inner vessel and the cover is applied to the outer vessel securely closing the vessel. Water in the sump of outer vessel is heated by any suitable heating member such as the gas burner of a stove. The water boils, steam vapor flowing upward through the passageway between the inner and outer vessels and downward in the inner vessel thereby displacing the heavier air or other non-condensible gases downward in the inner vessel, forcing the non-condensible gases through the slots into the tube and venting the non-condensible gases to the ambient atmosphere. A minor portion of the steam is of course vented to the atmosphere, but the purging of air is done very completely, since its downward displacement prevents appreciable mixture with the steam.

The vapor passing over the surfaces of the food product in the inner vessel heats the same while condensing in part upon the surfaces of the food product. The heating operation releases the juices of the food product as well as dissolves solids such as vitamins and minerals in the condensate. The heating operation is discontinued after a predetermined heating period, the length of which depends upon the kind of food product being blanched. In domestic blanching, the heating period may be discontinued by extinguishing the gas burner or by removing the closed vessel therefrom.

Preferably, in domestic blanching, the closed vessel is removed immediately from the stove to the sink. A vacuum gauge is attached to the vent to close the passageway between the inner vessel and ambient atmosphere. A stream of cooling water from a faucet is directed over the cover. The cooling water condenses the vapor in the vessel, decreasing the pressure therein and thereby causing evaporation of condensate from the food product to cool the same. The decrease in temperature in the vessel causes condensate and juices collected at the bottom thereof to boil upwardly through the food product to rewet the same thereby restoring the original weight of the food product and returning at least a portion of the original nutrients to the food product. Since the presence of even a slight trace of air or non-condensibles greatly retards the condensing on the vessel and evaporation from the food, it is highly important that the vessel be sealed securely and that all of the air be vented during the heating process.

In the present modification, the final weight of juice and food can be either greater or less than the initial weight. Enough initial water must be provided in the outer pan 30 so that vapor may be lost during the heating process without permitting pan 30 to run dry. Then during the cooling process a portion of the remaining condensate is collected in space 56 while the remainder of the juice and condensate is used to rewet the food (some slight portion remaining as juice at the end of the process). If the steam vented plus the condensate collected in space 56 exceeds the water initially placed in pan 30, then the weight of food and juice will decrease; if the reverse, the weight will increase.

The present invention provides a simple, ready, economical apparatus for processing food products and cooling the same which may be practiced in domestic processing operations. The apparatus provided by my invention assures that juices and dissolved solids are returned to the food product before freezing and restores substantially the initial weight of the product.

It will be appreciated if the food product is heated through the same range as it is cooled, substantially no change in weight of the food product will occur. The food will absorb substantially all of the juices since heating followed by cooling increases the absorptive capacity.

While I have described a preferred embodiment of the invention, it will be understood the invention is not limited thereto since it may be otherwise embodied within the scope of the following claims.

I claim:

1. In an apparatus for processing food products, the combination of a vessel having a circumferentially extending, radially outwardly disposed flange, a cover member having a concave inner surface and a radially outwardly disposed flange cooperable with said flange on said vessel for closing said vessel and adapted to securely retain said cover on said vessel when said vessel is subjected to internal and external pressures, a gasket positionable between and in contact with said radially disposed flanges of said vessel and said cover member and thereby adapted to seal said cover to said vessel in a fluid tight manner, said vessel having a bottom forming a sump for a liquid heating medium, a perforated support disposed within said vessel and spaced from the bottom thereof to retain a food product out of contact with the liquid heating medium contained in said sump, said gasket having a radially inwardly and upwardly, extending, imperforate flange portion cooperating with said cover member when the same is in position to close said vessel to form another liquid sump adapted to receive and retain condensate from the food processing operation, and vacuum breaker means communicating with the interior of said vessel to limit the vacuum therein and thereby to limit the evaporative cooling of a food product therein to a predetermined amount.

2. An apparatus for processing food products as defined in claim 1 further including means for directing flow of water which may be passed onto said cover out of contact with the sides of said vessel, said means comprising a downwardly extending rib circumferentially extending about the radially outer portion of said flange on said cover, said rib being of a dimension greater than the outer dimension of said vessel whereby water directed on said cover is caused to drip from said rib out of contact with the walls of said vessel.

3. An apparatus for processing food as defined in claim 1 including a conical foam breaker extending in a downward direction from the inwardly and upwardly extending flange portion of said gasket.

References Cited in the file of this patent

UNITED STATES PATENTS

| | | |
|---|---|---|
| 615,638 | Rinner et al. | Dec. 6, 1898 |
| 776,926 | Misner | Dec. 6, 1904 |
| 930,389 | Kleinfelder | Aug. 10, 1909 |
| 1,016,339 | Larson | Feb. 6, 1912 |
| 1,676,146 | Krafft | July 3, 1928 |
| 2,127,988 | Tarrant | Aug. 23, 1938 |
| 2,622,591 | Bramberry | Dec. 23, 1952 |